United States Patent [19]

Lee

[11] 4,353,207

[45] Oct. 12, 1982

[54] APPARATUS FOR REMOVING NOX AND FOR PROVIDING BETTER PLANT EFFICIENCY IN SIMPLE CYCLE COMBUSTION TURBINE PLANTS

[75] Inventor: Richard M. Lee, Media, Pa.

[73] Assignee: Westinghouse Electric Corp., Pittsburgh, Pa.

[21] Appl. No.: 180,052

[22] Filed: Aug. 20, 1980

[51] Int. Cl.³ ............................................. F02C 6/18
[52] U.S. Cl. ................................ 60/39.18 B; 122/7 B
[58] Field of Search .......................... 60/39.18 B, 39.5; 122/7 R, 7 B

[56] References Cited

U.S. PATENT DOCUMENTS 3,900,554 8/1975 Lyon .................................... 423/235
4,106,286 8/1978 Sakai et al. .......................... 60/39.5
4,160,805 7/1979 Inaba et al. ..................... 60/39.18 B

FOREIGN PATENT DOCUMENTS 55-114826 9/1980 Japan .............................. 60/39.18 B

OTHER PUBLICATIONS

Atsukawa et al., "Development of NOx Removal Processes with Catalyst for Stationary Combustion Facilities". MTB 124, May.
Hishinumo et al., "NOx Removal Process by Injection of NH₃ and H₂O in Gas Turbine Exhaust Gas", ASME 79-GT-G9, Mar., 1979.
Saleen et al., "Hitachi Zosen DENOx Process for Fossil Fuel Fired Boilers".

Primary Examiner—Louis J. Casaregola
Attorney, Agent, or Firm—E. F. Possessky

[57] ABSTRACT

In a single cycle combustion turbine power plant, a dry catalytic NOx removal module is disposed in the turbine exhaust stack. A waste heat exchanger system includes an economizer coil and a pair of evaporator coils on upstream and downstream sides of the $NO_x$ removal module to generate steam for injection into the turbine combustors. Bypass stacks across the coils are damper controlled to regulate the exhaust gas temperature at the entry to the NOx removal module. The compressor inlet guide vanes are closed to increase exhaust gas temperature as required after the upstream evaporator bypass flow reaches zero and no longer controls gas temperature. If the inlet guide vanes reach the fully closed position, reductant injection flow is shut off to terminate the NOx removal process under low exhaust gas temperature conditions. A plant afterburner is operated to add heat to the exhaust gas if gas temperature is too low.

7 Claims, 3 Drawing Figures

APPARATUS FOR REMOVING NOX AND FOR PROVIDING BETTER PLANT EFFICIENCY IN SIMPLE CYCLE COMBUSTION TURBINE PLANTS

BACKGROUND OF THE INVENTION

The present invention relates to system apparatus for removing nitrogen oxides (NOx) from plant combustion exhaust gases and more particularly to combustion turbine plant apparatus for removing NOx from the turbine exhaust gas at exhaust gas temperature conditions by the operation of a waste heat recovery arrangement.

In the operation of combustion turbines, NOx originates from nitrogenous compounds in the fuel used and from atmospheric nitrogen fixation during combustion. Natural gas is a relatively clean fuel from the standpoint of fuel bound NOx, but coal and oil can vary significantly in NOx content.

It is necessary for environment control that the combustion turbine plant be operated so that the combustion process is conducted without excessive NOx emissions and/or that the combustion exhaust gas be processed to remove NOx to less than allowable limits. It is desirable that NOx emission control be provided with little or no cost in plant operating efficiency.

Although some turbine combustion processes may be conducted with NOx emissions within allowed limits, there is a need for post-combustion NOx removal in many current design combustion turbines as well as many past combustion turbine installations. Where the flame temperature must be reduced to the point where plant efficiency is unacceptable in order to bring the combustion process within NOx emission limits, there is in fact a requirement for a NOx removal system.

One prior art arrangement for dry catalytic removal of NOx from boiler flue gases in a conventional steam power plant involves the injection of a reductant such as ammonia ($NH_3$) or carbon monoxide (CO) etc. into the exhaust gas. After catalyzed chemical reaction, NOx is converted into nitrogen ($N_2$) and water ($H_2O$).

For the NOx removal process to be effective in the dry catalytic removal system, the exhaust gas temperature typically must be within a determinable temperature range, i.e. within 610° F. to 810° F. in one presently available NOx removal system which uses $NH_3$ as a reductant. Above 810° F., $NH_3$ detrimentally begins to cause additional NOx generation and below 610° F. it detrimentally scavenges for SOx to form ammonium sulfate and ammonia bisulfate.

Another known kind of NOx removal process involves injection of $NH_3$ and heavy water ($H_2O_2$) into the exhaust gas from a combustion turbine. This wet process is described more fully in an ASME publication entitled NOx Removal Process by Injection of $NH_3$ and $H_2O_2$ in Gas Turbine Exhaust Gas and presented by Hitachi Ltd. personnel at the San Diego Gas Turbine Conference on Mar. 12–15, 1979.

Some background description on the dry type NOx removal process is set forth in (1) a publication entitled Development of NOx Removal Processes With Catalyst for Stationary Combustion Facilities and published by Mitsubishi Heavy Industry in a May 1977 Mitsubishi Technical Bulletin Number 124 and 2) another publication entitled Hitachi Zosen DeNOx Process For Fossil Fuel Fired Boilers presented by personnel of Hitachi and Chemico Air Pollution Control Corporation on November, 1978 at Westinghouse, Eddystone, Pennsylvania.

In known proposals for application of the dry NOx catalytic removal systems to combustion turbines, a NOx removal module is installed so that exhaust gas is mixed with cooler ambient air if it is too hot, or with hot bypassed combustion gas if it is too cool, to produce a gas mix at optimum temperature or at least within the required temperature range.

While NOx is removed from exhaust gas in the known related prior art, energy is consumed in providing for the NOx removal, as by gas mixing to regulate the exhaust gas temperature within range in the dry catalytic system. Energy consumption for NOx removal can reduce plant efficiency significantly.

It is therefore desirable that a more efficient NOx removal system be provided for combustion turbines employed in electric power generation or providing useful energy such as process steam or heating, etc.

SUMMARY OF THE INVENTION

A combustion turbine power plant includes a NOx removal system disposed in the path of exhaust gas from the plant combustion apparatus. Evaporator heat exchanger means are provided for extracting heat from exhaust gas upstream from the NOx removal system, and bypass duct means are operated with it to control the temperature of the exhaust gas as it enters the NOx removal system and to generate steam from the extracted heat thereby providing both for required NOx removal and improved plant efficiency.

DESCRIPTION OF THE PREFERRED EMBODIMENT

Figure 1:
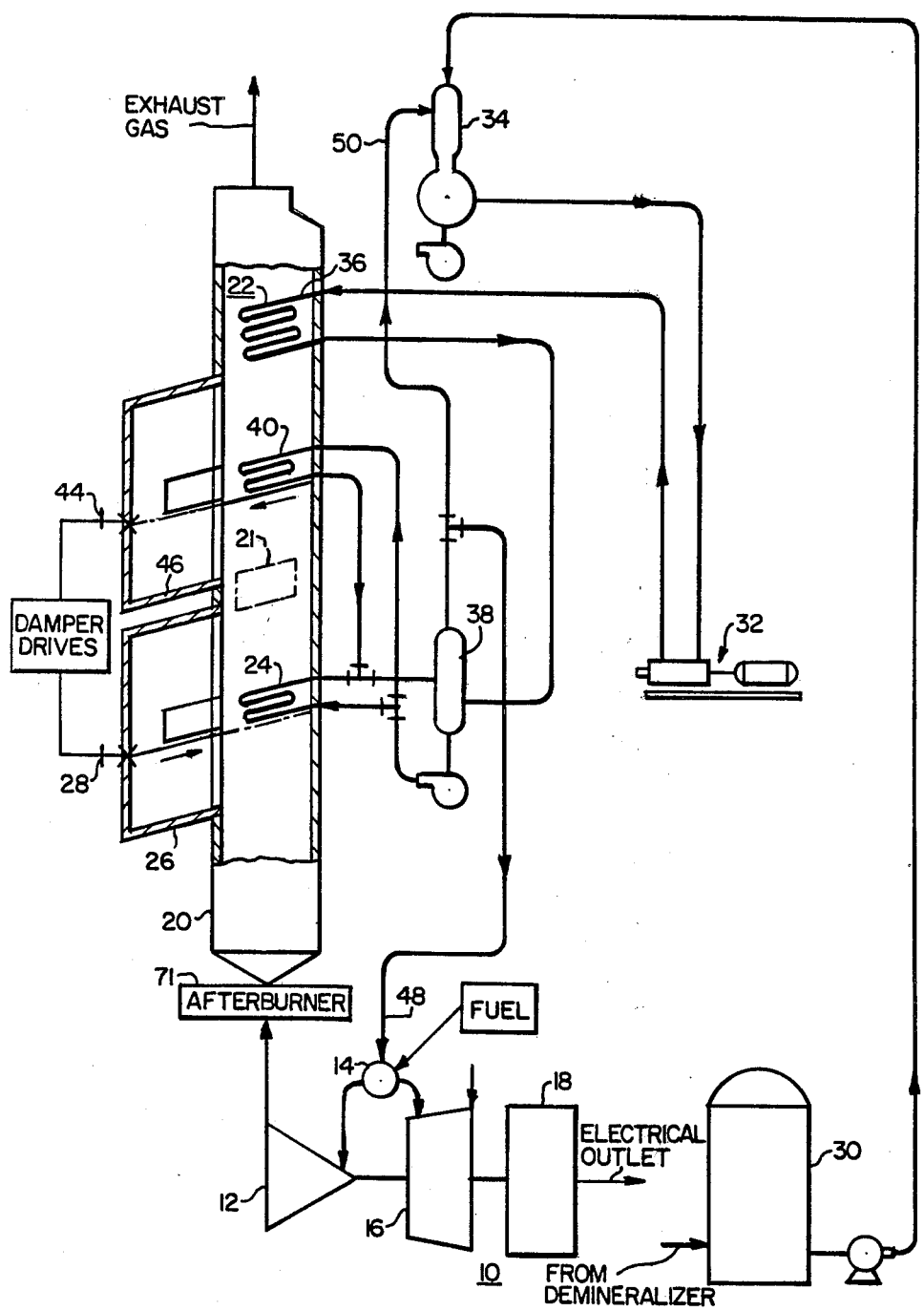
FIG. 1 shows a schematic view of a combustion turbine power plant apparatus in which NOx is removed from exhaust gas in accordance with the principles of the invention.

More particularly, there is shown in FIG. 1 an electric power plant 10 in the form of a single cycle combustion turbine power plant. A combustion turbine 12 employs combustors 14 which burn natural gas or oil or other suitable fossil fuel.

The turbine 12 drives a compressor 16 to provide intake air which supports combustion in the combustors 14 and provides mass flow to drive the turbine blades. A generator 18 is driven by the turbine 12 to produce electric power.

Turbine exhaust gas is directed through an exhaust duct 20 to a stack for discharge to the atmosphere.

Emission standards such as California ARB Rule 475.1 for nitrogen oxides (NOx) are strict and NOx emissions from combustion turbines and other combustion devices must be reduced accordingly for the apparatus to be usable at the locations where the emission limits apply. Conventional means, i.e. fuel lean combustion and water or steam injection developed to decrease NOx emissions from combustion turbines through combustion process modification, have limited capability. Further, with water injection, thermal efficiency decreases because of the heat losses produced by water discharged through the stack. With steam, more injection is required to achieve the same degree of NOx reduction as water. Since combustion modification technology is limited in meeting emission requirements, it is necessary to employ NOx removal apparatus as previously suggested herein.

Combustion turbine exhaust gas is distinguishable from the exhaust gases of other combustion devices such as boilers. The amount of excess air which is admixed in a turbine combustor is about three times that which is admixed in a boiler with the same output power, and this causes the combustion turbine to produce large amounts of exhaust gas. The oxygen concentration of combustion turbine exhaust gas is typically about 15% and the temperature of the gas is typically about 950° F.

Boiler flue gas may typically be about 650° C. The NOx removal process employed in the exhaust gas accordingly must be suitable and effective for the conditions of the exhaust gas in the particular plant.

In this case, it is preferred that a commercially available dry catalytic NOx removal system 21 be employed to remove NOx from the turbine exhaust gas. A suitable system is one provided by Chemico Air Pollution Control under license from Hitachi Ltd. and operating in accordance with a process known as the Hitachi-Zosen Dry Catalytic De-Nox Process.

As previously indicated herein, the effectiveness of the dry catalytic NOx removal system 21 is dependent on the exhaust gas temperature. Thus, a heat recovery and bypass duct arrangement 22 is disposed in the exhaust duct 20 to provide waste energy reception for higher plant efficiency while simultaneously providing for exhaust gas temperature control which provides for efficient NOx removal.

Basically, exhaust gas temperature at the entry point to the NOx removal system 21 is regulated by the amount of exhaust gas flow through a heat recovery modulating evaporator coil 24 and the amount of exhaust gas flow through a bypass duct 26 which diverts gas around the coil 24 to the entry to the NOx removal system 21. As more gas is diverted through the bypass duct 26 under the control of a motor operated damper 28, less gas passes through the evaporator coil 24, less heat is removed, and the temperature of the remixed bypass flow and the main duct flow at the entry to the NOx removal system 21 is reduced less from the temperature of the main flow before bypass. As less exhaust gas is diverted through the bypass duct 26, the opposite occurs.

Dampers 28 and 44 are the sliding door type. They slide in and out of duct 20 and ducts 26 and 46. They are coupled in such a manner that as damper 28 slides out of bypass duct 26 and into the main duct 20, the other damper 44 retreats back into bypass duct 46 and vice versa. To prevent leakage, proper sealing is provided at the points of entry of the dampers to the main duct.

The heat recovery system 22 further includes a feedwater storage tank 30 which is supplied from a demineralizer. A feedwater pump 32 drives feedwater to an economizer coil 36 from the tank 30 and a deaerator 34. The feedwater is heated in the economizer coil 36 in the downstream region of the exhaust duct 20 where the gas temperature is lower than it is at the duct entry point.

Feedwater flows from the economizer coil 36 to a steam drum 38 where it is directed to an evaporator coil 40 downstream from the NOx removal system 21 and to the gas temperature control evaporator coil 24. A motor operated damper 42 also controls bypass exhaust gas flow through a bypass duct 46 across the downstream evaporator coil 40.

High pressure steam is produced in the evaporator coils 24 and 40 and it flows to the drum 38 where it is available as recovered heat energy for plant or process needs. In this case, it is preferred that steam be used as a supply for conventional steam injection into the combustion chambers 14 as indicated by steam pipe 48. Part of the steam is recycled to the deaerator 34 for feedwater heating as indicated by pipe 50.

NOx REMOVAL

Figure 3:
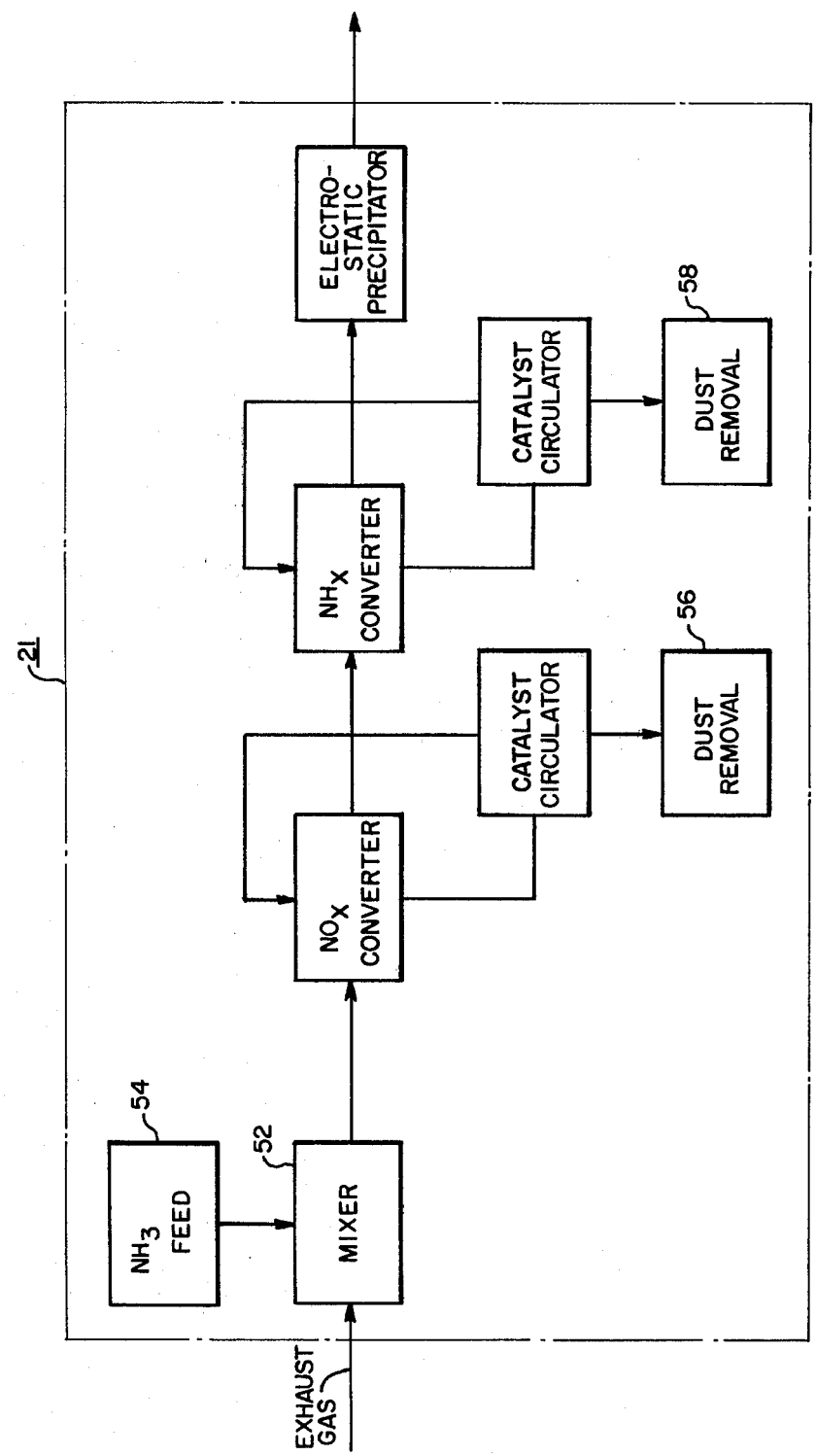
FIG. 3 shows a schematic block diagram of a typical commercially available NOx removal system for the power plant of FIGS. 1 and 2.

The NOx removal system 21 is shown in greater functional block detail in FIG. 3 to provide a fuller understanding of the invention.

Nitrogen oxides in fossil fuel combustion originate from nitrogenous compounds in the fuel and from atmospheric nitrogen fixation during combustion. As already indicated, some reduction of NOx in exhaust gas can be achieved through combustion modification, or by steam or water injection. Where combustion modification procedures fail to reduce NOx emissions below limits, exhaust NOx removal procedures are needed and catalytic reduction has been found to be successful in meeting NOx removal requirements in various boiler applications.

Mixing of exhaust gases with a suitable reducing agent is followed by contact with a solid catalyst surface which selectively adsorbs nitrogen oxides and the reducing agent. The adsorbed components undergo a chemical reaction on the catalyst surface and the reaction products are desorbed. A variety of catalysts have been developed; the preferred reducing agent for nitrogen oxides is ammonia.

Ammonia reduces nitrogen oxides into nitrogen and water. In the Hitachi-Zosen process, NOx removal is temperature dependent as previously described herein. The following formulas define the denitrification reactions which apparently occur during operation of the NOx removal process:

$$4NO + 4NH_3 + O_2 \rightarrow 4N_2 + 6H_2O \quad (1)$$

$$6NO + 4NH_3 \rightarrow 5N_2 + 6H_2O \quad (2)$$

$$2NO_2 + 4NH_3 + O_2 \rightarrow 3N_2 + 6H_2O \quad (3)$$

$$6NO_2 + 8NH_3 \rightarrow 7N_2 + 12H_2O \quad (4)$$

$$4NH_3 + 3O_2 \rightarrow 2N_2 + 6H_2O \quad (5)$$

In the NOx removal system 21 (FIG. 3), exhaust gas preferably in the temperature range of 610° F. to 810° F. is mixed in block 52 with gaseous ammonia (approximately equi-molar ratio) which is injected into the exhaust flow from a liquid ammonia storage tank as indicated by the reference character 54. The gaseous ammonia is preferably diluted with air before injection, and a network of nozzles may be employed to achieve uniform mixing of NH3 and exhaust gas. The gas mix is then passed through a fixed bed catalyst reactor where nitrogen oxides are reduced by ammonia to nitrogen and water over the catalyst surface. Two basic controls are needed for best denitrification.

Reactor temperature control has been provided in the prior art by an auxiliary furnace at low loads. At higher loads in steam turbine plants, it has been suggested that gas temperature control be provided by an economizer bypass duct or through economizer water flow control.

Ammonia feed control can be provided by measuring gas throughput and NOx concentration. Both NOx and ammonia can be monitored in the stack to provide additional signals for adjusting ammonia feed.

As previously indicated, exhaust gas temperature control in combustion turbine plants has been limited to the mixing of ambient air with the exhaust gas for cooling and the mixing of hot combustor outlet air with the exhaust gas for heating.

The Hitachi-Zosen catalyst reactor typically is fabricated with sheet metal as a block having a honeycomb geometry. A number of honeycomb blocks can be installed in the exhaust duct to provide the needed catalyst reactor volume.

In addition to gas temperature and ammonia injection flow and reactor geometry, NOx removal also requires the presence of some oxygen in the exhaust gas. Moisture in the exhaust gas causes a small decrease in catalyst activity.

NOx concentration has no effect on the catalyst reaction if a stoichoimetric ammonia flow is maintained. Dust can adhere to or abrade the catalyst surface and thereby affect catalyst performance. Dust effects are minimized by reactor design and by use of suitable blowers 56 and 58 (FIG. 3).

SYSTEM OPERATION

Figure 2:
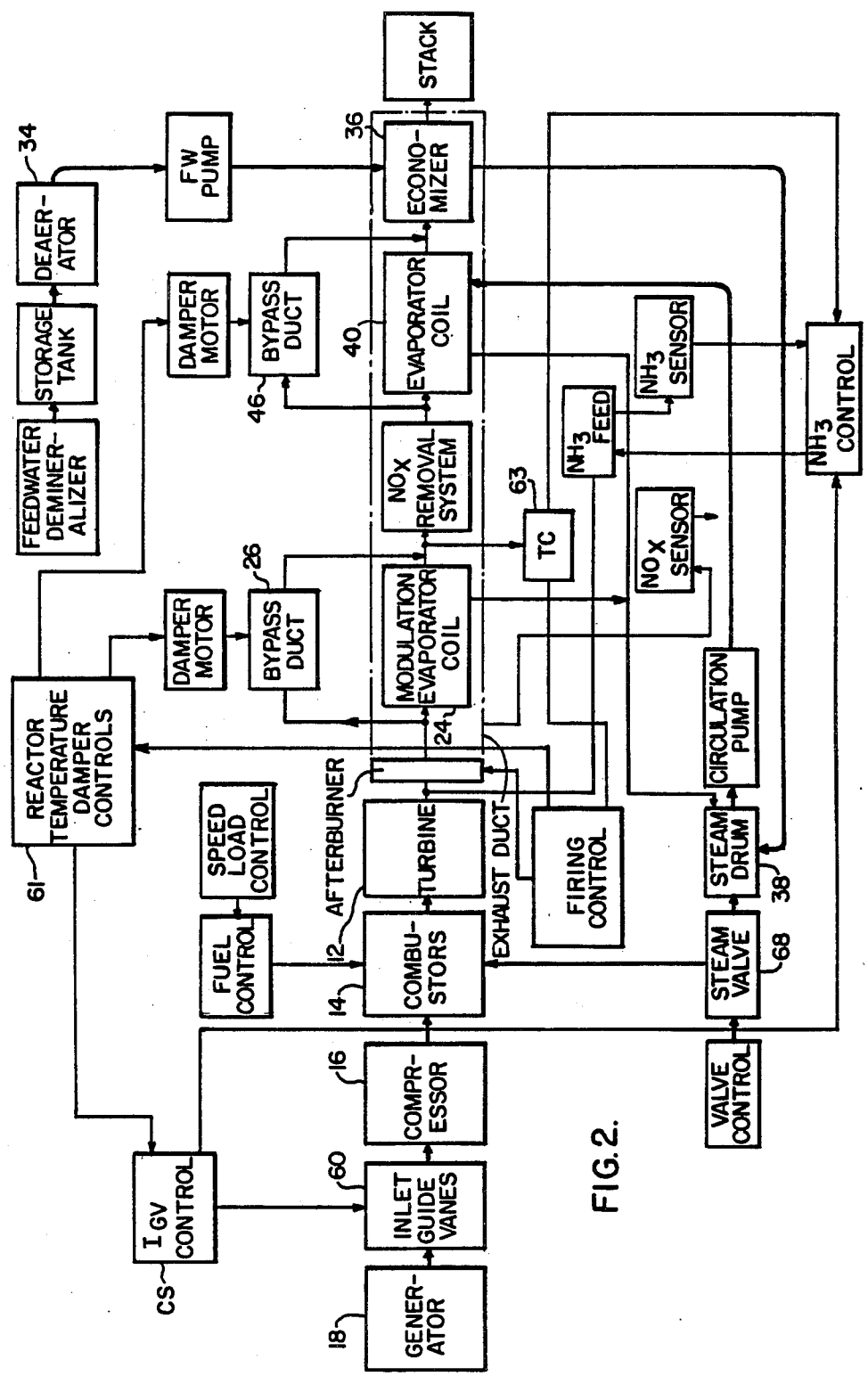
FIG. 2 shows a schematic block diagram of the plant of FIG. 1 with some portions illustrated in greater detail.

In FIG. 2, the system is shown in greater functional block detail. Identical elements in FIGS. 1 and 2 have been assigned identical reference characters.

In the simple cycle combustion turbine application of the invention the heat recovery steam generator is modified from the combined cycle arrangement described in the copending application. The superheater coil, the low pressure coil and the low pressure economizer are omitted and only a relatively small amount of saturated steam is generated for NOx control and plant performance improvement.

The total amount of injection steam is limited by compressor surge margin or combustion limitation so as not to extinguish the combustion flame.

The heat recovery steam generator includes the two evaporator coils 24 and 40 upstream and downstream from the NOx removal system, the economizer coil 36 and the deaerating feedwater heater 34.

Steam generated in the evaporators is combined in the steam drum 38. A bypass stack 26 or 46 is provided around each evaporator coil 24 or 40.

At design point, the bypass stack 26 is completely shut and the bypass stack 46 is fully open. Saturated steam of required quantity is made in the evaporator coil 24.

As the damper 28 in the bypass stack 26 opens sliding into duct 20, the damper 44 in the bypass stack 46 closes (retreats into bypass duct 46). Under low exhaust temperature condition, the evaporator coil 24 is bypassed and the evaporator coil 40 produces the required steam. Throughout the plant operating range, optimum reaction temperature is maintained by damper controls 61 which vary the bypass duct openings in response to a gas temperature sensor 63 to divide steam generation in the evaporator coils 24 and 40 through variation of the gas temperature and gas flow split.

Turbine exhaust temperature is also increased when further increase is needed and the bypass duct 26 is fully opened; thus, when the temperature sensor signal indicates a gas temperature below desired value and the damper 28 is fully opened, a conventional IGV control 65 closes compressor inlet guide vanes 60. When the gas temperature reaches the lower end of optimum reaction temperature (say 600° F.) with fully closed inlet guide vanes 60, the minimum part load operation point is established. Lower part load operation takes place with the reductant (e.g. $NH_3$) feed shut off by conventional $NH_3$ flow control 64, or supplementary firing 71 (shown in FIG. 1) is instituted to raise the exhaust gas temperature to keep it in range.

Since the injected steam is lost through the stack, 100 percent make-up water is needed. To this end, water from the demineralizer is pumped to the deaerator (via the storage tank) and feedwater heating is accomplished by excess steam generated in the evaporator coils.

If desired, the various controls can be conventional units which are interfaced with suitable logic and actuation circuitry which effectuates the described system operation. Thus, damper controls 61, IGV control 65 and ammonia feed control 64 are conventional units with interfacing circuitry which causes: p (1) position control of the bypass dampers as described under the control of the temperature sensor 63;

(2) initiation of IGV operation for exhaust gas temperature control under the control of the temperature sensor 63;

(3) shutoff of the $NH_3$ feed by the control 64 when the inlet guide vanes are fully closed and temperature sensor 63 reads below 600° F.; and (4) Turn on the supplementary firing to increase the gas temperature if desired.

Steam produced by the evaporator coils 24 and 40 is supplied to the combustors 14 through valve 68. Valve control 70 conventionally regulates steam injection on the basis of steam/fuel ratio and the combustor shell pressure limit.

In addition to NOx removal, steam injection also improves plant performance due to the increased mass flow and the higher specific heat of steam as compared to air. Thus, increased injection steam beyond that required for NOx control not only increases the extent of exhaust energy recovery of the simple cycle combustion turbine plant but also provides additional safety margin for most stringent future pollution limits. Further, typical simple cycle combustion turbine output drops and heat rate deteriorates under hot summer ambient conditions. Steam injection allows a fairly constant power and heat rate over a wide ambient range.

Injection of superheated steam further benefits plant performance, since less fuel is required to heat superheated steam to turbine inlet temperature than to heat saturated steam, if it is acceptable from a NOx reduction standpoint. In such case, a superheater coil is added upstream of the evaporator 24.

Deaerating feedwater heating may be accomplished by economizer recirculation or low pressure boiler and low pressure economizer. Thus, if excess steam generated can be used elsewhere, e.g. for process or heating etc., the stack temperature can be dropped to recover fully the exhaust energy with use of low grade heat for feedwater heating.

The presence of the evaporator coil 24 upstream from the NOx removal system 21 may also serve as an additional mixer which aids to distribute the reductant feed and improves reaction. In which case, the $NH_3$ feed system is located upstream of evaporator coil 24.

Application of the invention to new or existing combustion turbine plants offers an immediate solution which allows the operation of a combustion turbine engine in areas where stringent NOx standards cannot be met through steam injection alone without deareating.

The heat recovery steam generation system disclosed herein offers a workable scheme which provides a controlled optimum reaction temperature throughout the normal load range. Injection of steam beyond the requirement for NOx control further improves plant performance which in turn reduces overall plant costs.

What is claimed is:

1. Apparatus for recovering heat energy and for removing NOx from the exhaust combustion gas in a single cycle combustion turbine power plant having an exhaust gas duct means, said apparatus comprising NOx removal means for mixing a reductant with the exhaust gas and for generating a catalytic reaction which removes NOx from the exhaust gas within a predetermined gas temperature range, a waste heat recovery system including an economizer coil disposed in said duct means downstream from said NOx removal means and a feedwater supply system for said economizer coil, a steam drum supplied by said economizer coil, a modulating evaporator coil disposed upstream from said NOx removing means and supplied by said steam drum, another evaporator coil disposed downstream from said NOx removing means and supplied by said steam drum, said evaporator coils supplying steam to said steam drum, means for sensing exhaust gas temperature upstream from said NOx removing means, a bypass stack disposed across said modulating evaporator coil, movable damper means for diverting exhaust gas flow from said duct means through said bypass duct, means for positioning said damper means in response to said gas temperature sensing means to hold the exhaust gas temperature within the desired NOx removal range, and means for receiving steam from said steam drum to make production use of the energy therein.

2. Apparatus as set forth in claim 1 wherein another bypass stack is also disposed across the downstream evaporator coil, damper means are provided for diverting exhaust gas from said duct means through said bypass duct, means are provided for positioning the downstream bypass stack damper means so that it closes the bypass flow when said modulating coil bypass damper means opens the bypass flow and vice versa thereby providing for shifting the steam production requirements between said evaporator coils as exhaust gas temperature in the NOx removal means is controlled by damper means operation.

3. Apparatus as set forth in claim 1 wherein means are provided for controlling the turbine compressor inlet guide vanes to control the exhaust gas temperature when said modulating evaporator coil bypass duct is fully opened.

4. Apparatus as set forth in claim 1 wherein said steam receiving means includes means for injecting a controlled steam flow into combustors provided for said turbine.

5. Apparatus as set forth in claim 1 wherein means are provided for controlling the injection of the NOx reductant into said exhaust duct, and means are provided for shutting off the reductant injection flow when the exhaust gas temperature cannot not be held above a predetermined minimum value.

6. Apparatus as set forth in claim 1 wherein supplementary firing means are provided to raise the exhaust gas temperature when it is too low for proper operation of said NOx removing means.

7. Apparatus as set forth in claim 1 wherein said NOx removal means is the dry catalytic type and the reductant is ammonia or other chemicals such as CO, etc.

* * * * *